UNITED STATES PATENT OFFICE.

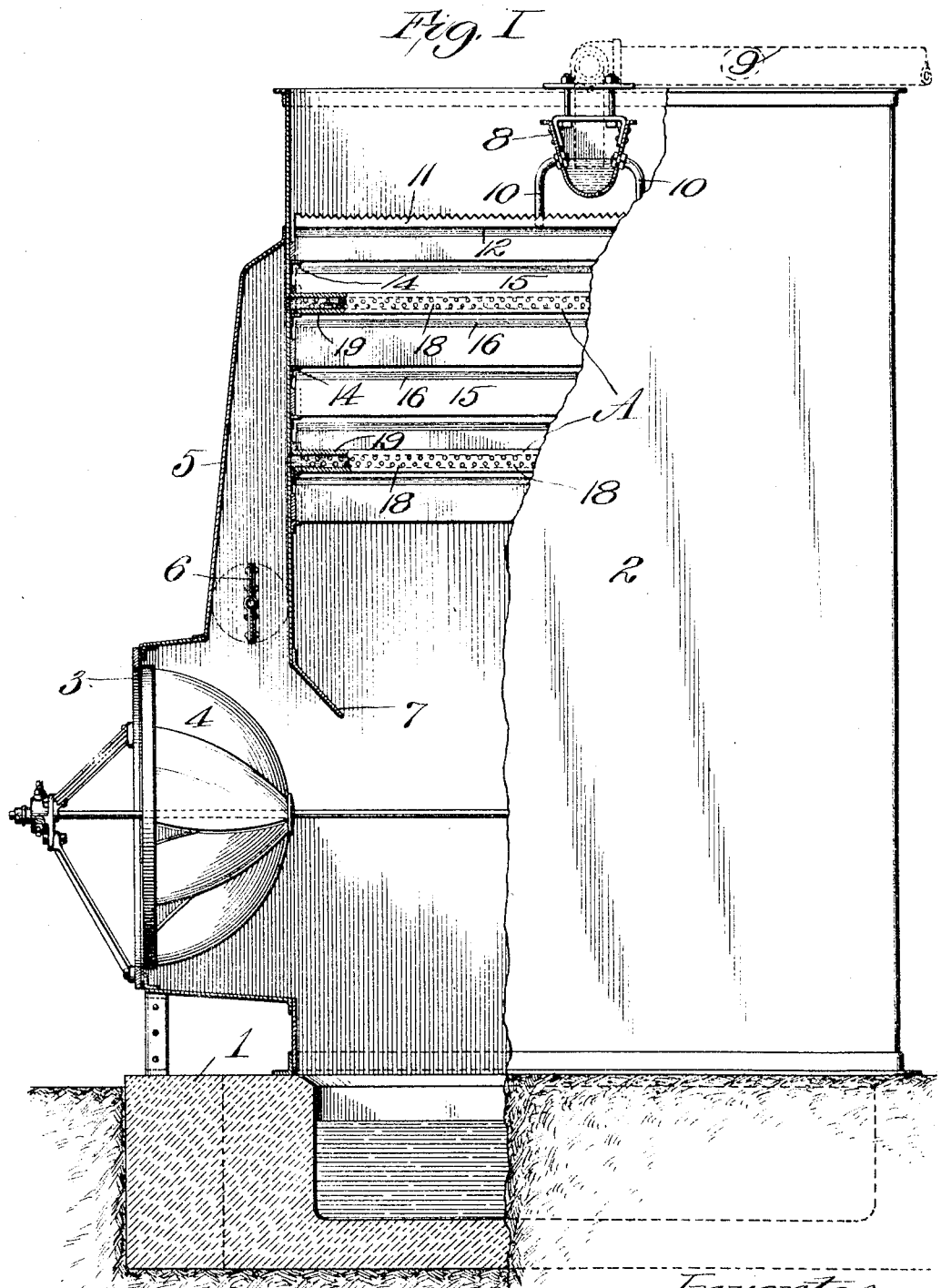

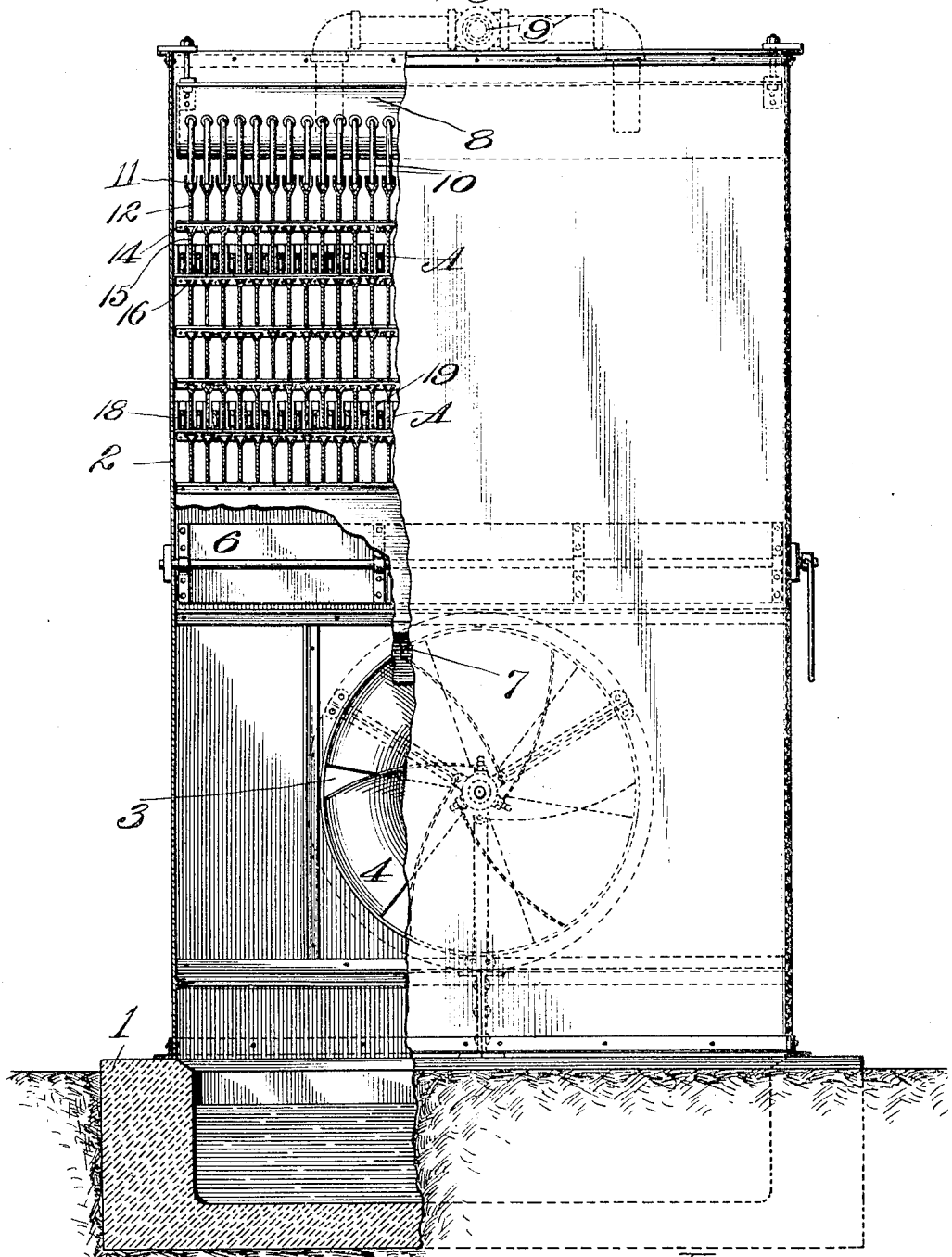

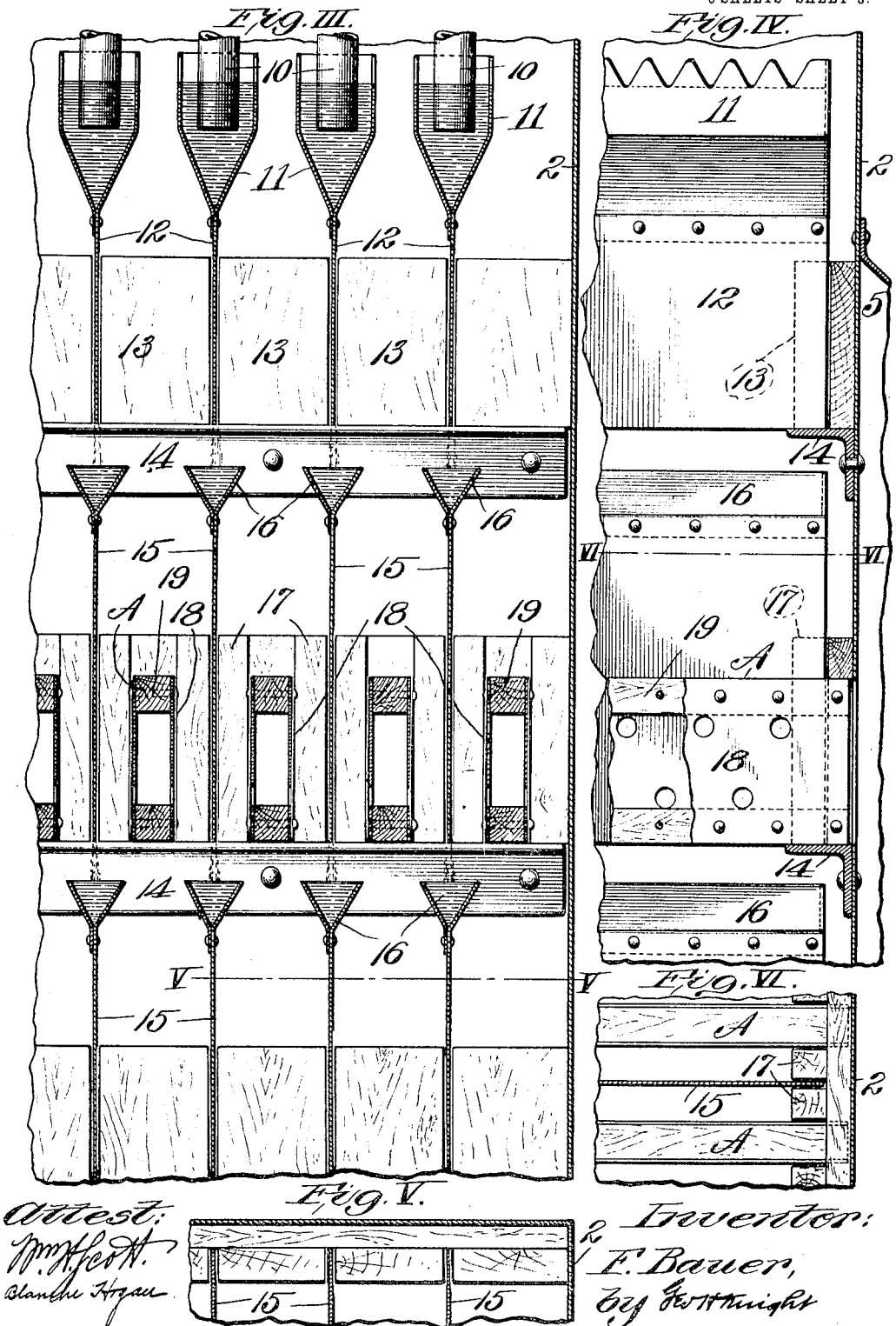

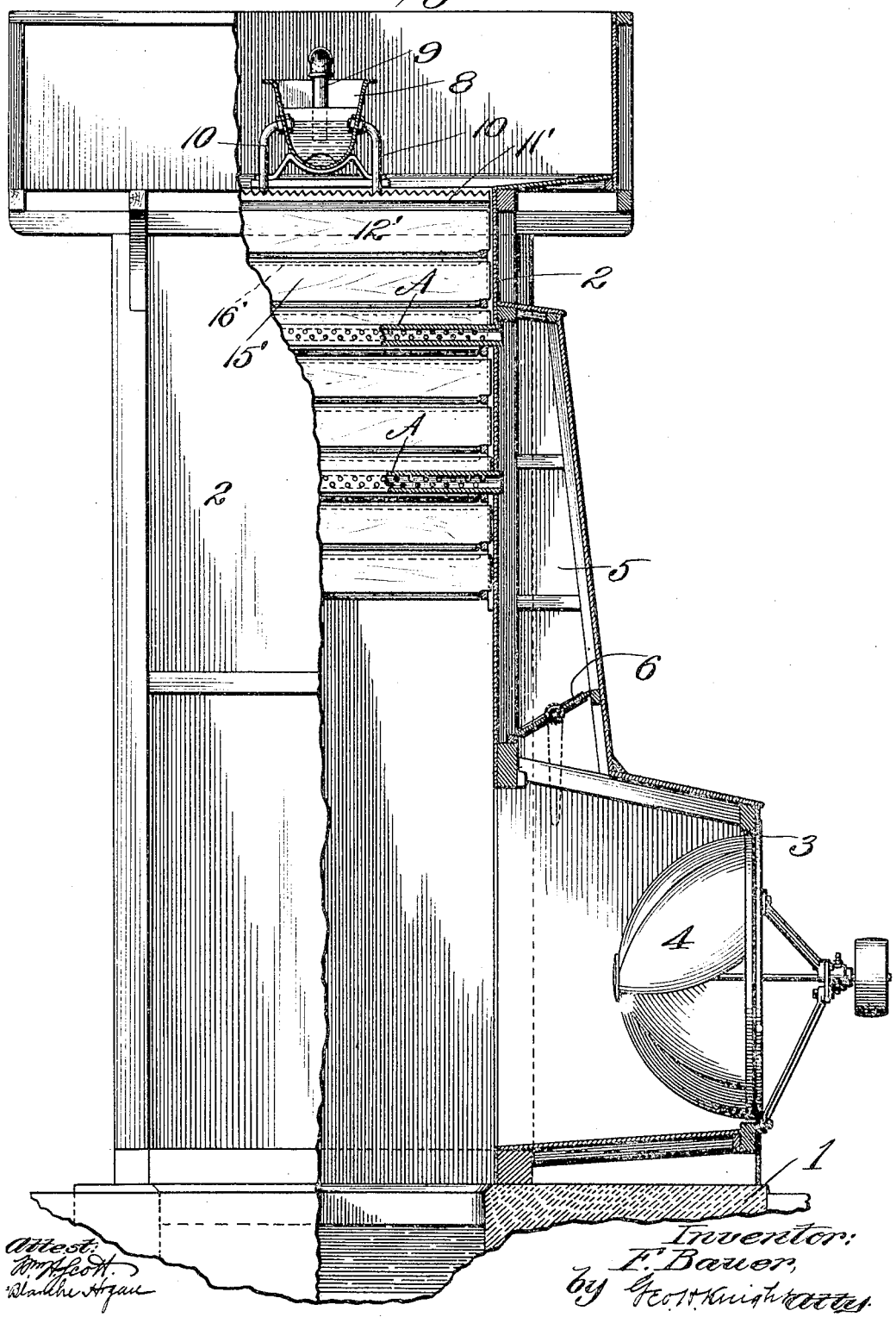

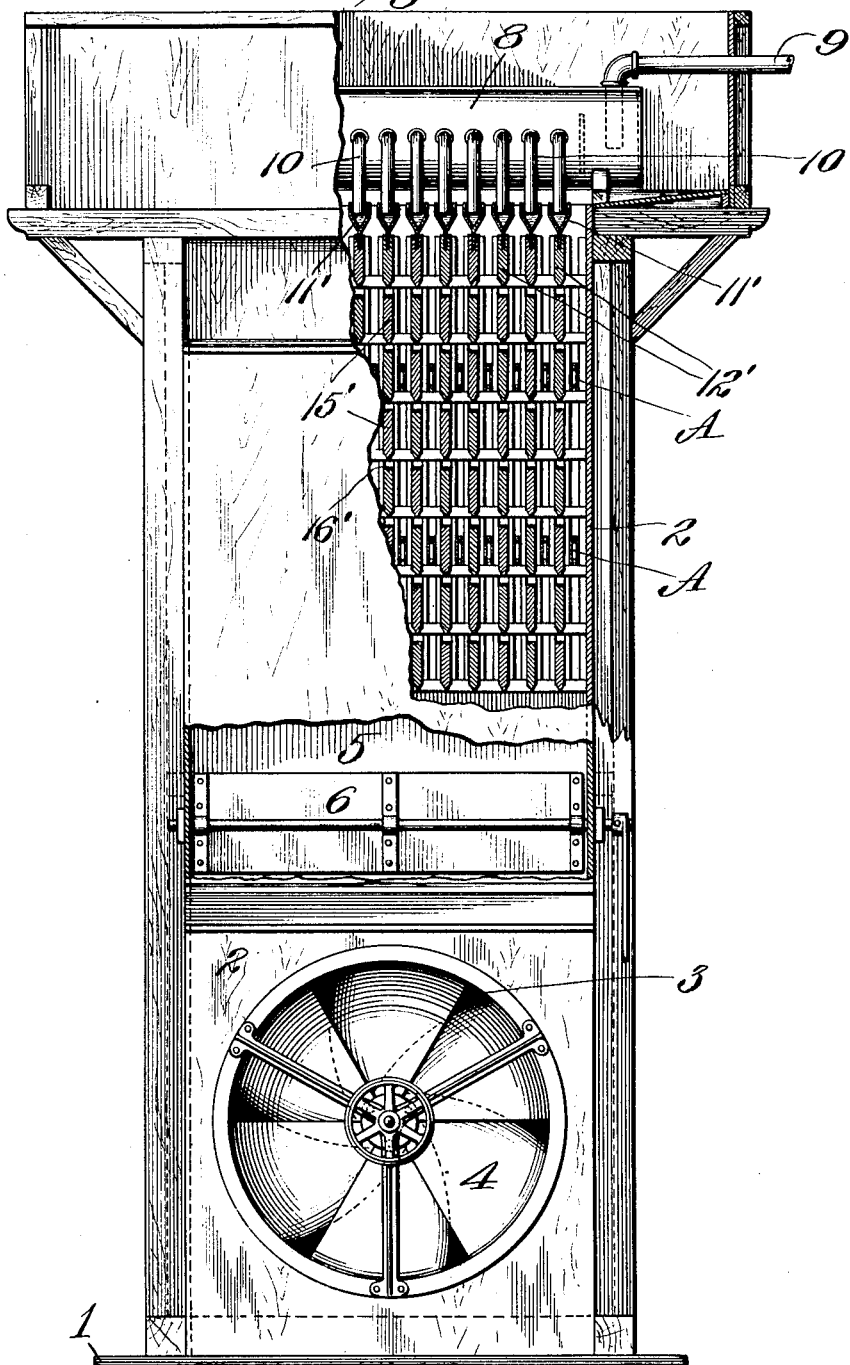

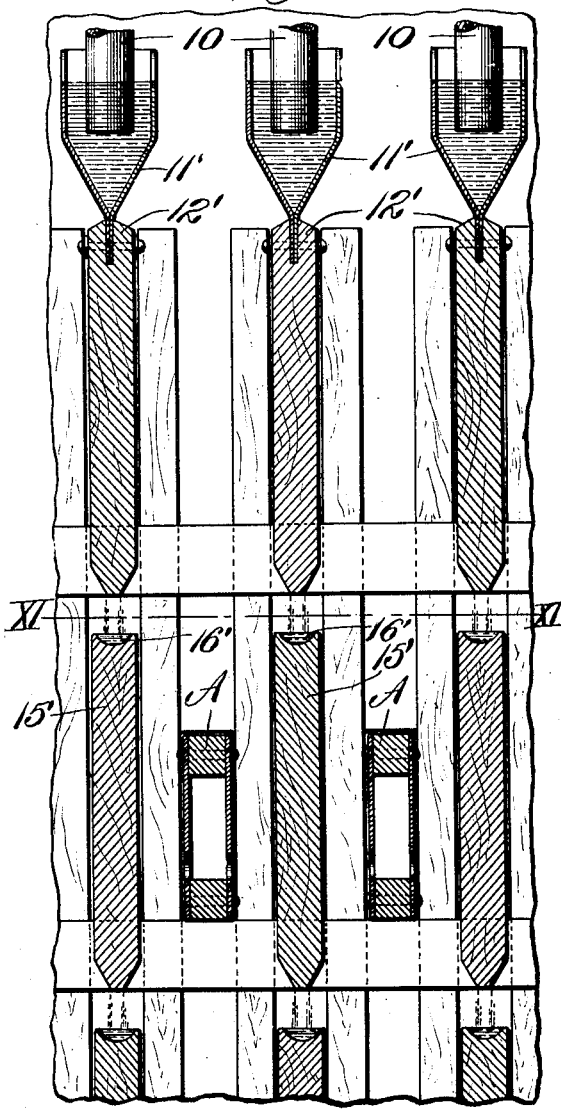
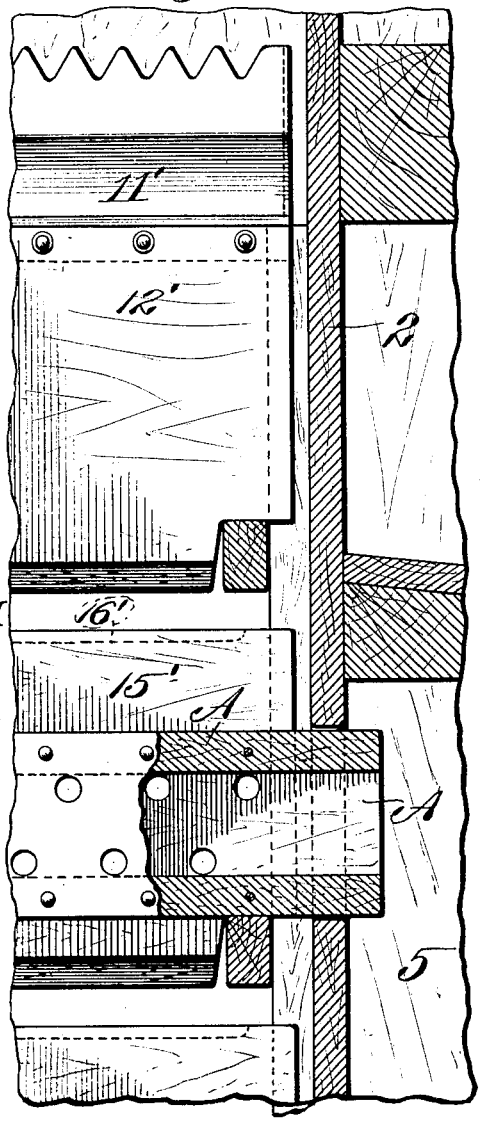
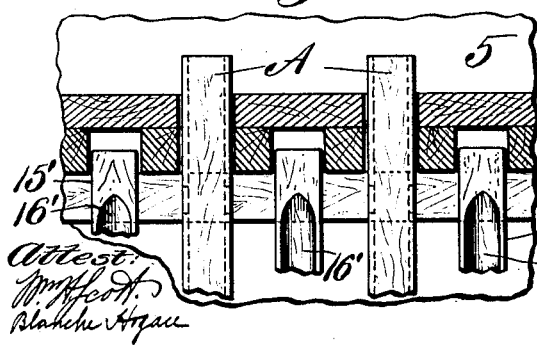

FERDINAND BAUER, OF ST. LOUIS, MISSOURI.

LIQUID-COOLING APPARATUS.

No. 927,766.  Specification of Letters Patent.  Patented July 13, 1909.

Application filed February 19, 1908. Serial No. 416,640.

*To all whom it may concern:*

Be it known that I, FERDINAND BAUER, a citizen of the United States of America, residing at the city of St. Louis, in the State of Missouri, have invented certain new and useful Improvements in Liquid-Cooling Apparatus, of which the following is a full, clear, and exact description, reference being had to the accompanying drawings, forming part of this specification.

My invention relates to that class of apparatus used for the cooling of large quantities of liquids, such as water, by delivering them at the top of a shaft in which they descend in vertical sheets or films and in contact with ascending currents of air, whereby the heat in the water is extracted.

The object of the present improvement is to provide a construction of this character whereby the air may be delivered horizontally into the cooling apparatus shaft at different elevations therein, thereby increasing the efficiency of the apparatus as compared with similar apparatus in which air is forced upwardly directly through the shaft from the bottom to the top thereof.

A further object of my improvement is to provide more efficient vertically arranged distribution members for the liquid to be cooled in order that the air passed through the apparatus will have better cooling effect upon the liquid.

Figure I is a view partly in elevation and partly in vertical section of my apparatus. Fig. II is a view partly in elevation of the apparatus viewed at a side at an angle to that in which it is viewed in Fig. I and partly in vertical section taken at right angles to the section shown in Fig. I. Fig. III is an enlarged vertical section of a portion of the interior structure of the apparatus. Fig. IV is a vertical section taken through part of the apparatus illustrated in Fig. III. Fig. V is a horizontal section taken on line V—V, Fig. III. Fig. VI is a horizontal section taken on line VI—VI, Fig. IV. Fig. VII is a view similar to Fig. I illustrating a modified construction of my apparatus. Fig. VIII is a view similar to Fig. II illustrating the modified construction. Fig. IX is a view similar to Fig. III of the modified construction. Fig. X is a view similar to Fig. IV of the modified construction. Fig. XI is a horizontal section taken on line XI—XI, Fig. X.

In the accompanying drawings: 1 designates a catch basin at the bottom of my apparatus into which the water that has been cooled is delivered.

2 is the casing of the apparatus within which is a vertical shaft through which the liquid to be cooled descends vertically in sheets or films to be deposited in the catch basin. The shell 2 is provided at one side with an air inlet 3 through which air is drawn by a fan 4. At one side of the casing 2 is a vertical duct 5 located above the fan 4 and into which the air delivered into the casing by the fan is blown. This duct is preferably controlled by a damper 6. To cause the air to be delivered into the duct by the fan I preferably locate at the lower end of the duct and at the inner wall thereof a deflecting guard 7 that is inclined downwardly and toward the center of the shaft in the casing.

8 designates a receiving tank at the top of my apparatus into which the liquid to be cooled is delivered when conducted from a suitable source through the feed pipe 9.

10 are discharge pipes leading from the tank 8.

11 designates a series of overflow gutters located beneath the discharge pipes 10 and into which the liquid to be cooled is emptied by said pipes. These gutters preferably have serrated side walls, as seen most clearly in Fig. IV. The gutters 11 are arranged in series parallel with each other and extend across the interior of the casing 2 or the shaft of my apparatus and beneath each gutter is a vertical web 12 on which the liquid to be cooled descends as it overflows from the gutter, thereby exposing a thin sheet or film of liquid to the cooling action of air delivered laterally into the shaft of the apparatus. The vertical webs 12 are held in a separated condition by distance pieces 13 mounted upon rails 14, see Figs. III and IV, that serve as supports for said distance pieces and also for the overflow gutters and their vertical webs.

15 are vertical liquid distributing members extending uninterruptedly across the space within the casing 2 and vertically positioned in series beneath and in alinement with the overflow gutters 11 and their vertical webs, there being preferably several tiers of these distributing members and the number of members in each tier being in correspondence to the number of overflow gutters at the top of the apparatus. Each distributing member is provided at its upper end with a trough 16 into which the liquid descends to overflow therefrom and descend upon the vertical web of the member in a thin sheet or film in correspondence to its flow at the exterior of the gutters 11 and the vertical webs beneath said gutters. The liquid is delivered from the vertical webs of the overflow gutters into the troughs of the upper tier of the vertical liquid distributing members 15 and thereafter falls from each set of the vertical liquid distributing members 15 to the next succeeding set of vertical liquid distributing members until it finally descends into the catch basin 1. By providing the vertical liquid distributing members 15 with troughs located at their upper ends I cause the liquid to be more gradually and evenly delivered to the vertical bodies of said members beneath their troughs and therefore secure more efficient cooling action upon the liquid by the contact of the air that is delivered laterally into the shaft of the apparatus. The various tiers or sets of vertical liquid distributing members 15 are supported by side rails 14 beneath the side rails that support the overflow gutters 11 and said vertical liquid distributing members are maintained in their proper positions by distance members 17 located between the vertical liquid distributing members 15 and above the side rails by which said vertical liquid distributing members are supported.

The overflow gutters 11 and their vertical webs 12 and the vertical liquid distributing members 15 and their troughs 16 are in the construction illustrated in Figs. I to VI inclusive, made of metal, this material being preferably employed by reason of the fact that better cooling action for the liquid may be thereby secured and the durability of the parts mentioned is greater than it would be if such parts were made of wood.

The air for cooling effect upon the liquid to be cooled in my apparatus is forced into the duct 5 as previously explained and this air passes laterally from said duct into the shaft of the apparatus between the vertical liquid distributing members 15 at different levels in the shaft. The delivery of the air at such different levels is accomplished by means of flues to be next described.

A designates the air delivery flues horizontally positioned in the apparatus and which consist of perforated vertical side plates 18 that are held separated from each other by parting strips 19. The flues A are open at their ends which are presented to the duct 5 and the wall of the casing against which said ends of the flues abut are perforated in order that the air forced into said duct may be delivered laterally into the flues A to be distributed within the shaft of the apparatus according to the location of any particular flue—whether at one level in the apparatus or a higher or lower level in the apparatus. By providing the air distributing flues A at the different levels I deliver the air laterally from the duct 5 into said flues irrespective of the other flues above or beneath any particular flue so that the air discharged laterally therefrom will have a more efficient cooling effect on the liquid passing through the apparatus than it would if the flues were all located in a common level or if the air was delivered entirely at the bottom of the apparatus and forced upwardly through the shaft.

In Figs. VII to XI inclusive, I have shown a modified construction of my apparatus. The construction in this modification corresponds in general to the construction previously described and the only characteristic features of distinction between the construction in the modification and the previously described construction are to be found in the construction of the vertical liquid distributing members in the apparatus. These vertical liquid distributing members comprise the overflow gutters 11' mounted in the vertically disposed wooden slats 12' that take the place of the vertical webs 12 between the overflow gutters 11 and they also comprise the vertical liquid distributing members 15' in the shape of vertically disposed wooden slats that are provided at their top edges with troughs 16' into which the liquid descends to overflow therefrom onto the vertical distributing members 15' and descend throughout the apparatus onto the succeeding vertical liquid distributing members. The horizontal air distributing flues A are located between the vertical liquid distributing members 15' in correspondence to their locations in the previously described construction and the liquid to be cooled and the air for cooling effect upon the liquid are delivered into the apparatus in essentially the same manner as that previously described.

I claim:

1. A liquid cooling apparatus comprising a casing provided with an air duct, vertical liquid distributing members in said casing, air distributing means in said casing by which air is conducted from said duct in a direction transverse of said casing, and means for forcing air into said duct and therefrom into said air distributing means, substantially as set forth.

2. In a liquid cooling apparatus, a casing provided with an air duct, vertical liquid distributing members within said casing, flues horizontally disposed within said casing between said vertical liquid distributing members and having communication with said duct, and means for forcing air through said duct and into said flues, substantially as set forth.

3. In a liquid cooling apparatus, a casing provided with an air duct, vertical liquid distributing members within said casing, perforated flues horizontally disposed within said casing between said vertical liquid distributing members and having communication with said duct, and means for forcing air through said duct and into said flues, substantially as set forth.

4. In a liquid cooling apparatus, a casing having an air duct, vertical liquid distributing members within said casing, flues located within said casing at different levels and having communication with said duct, and means for forcing air through said duct and said flues, substantially as set forth.

5. In a liquid cooling apparatus, a casing having an air duct, vertical liquid distributing members within said casing, perforated flues located within said casing at different levels and having communication with said duct, and means for forcing air through said duct and said flues, substantially as set forth.

FERDINAND BAUER.

In presence of—
BLANCHE HOGAN,
H. G. FLETCHER.